(12) United States Patent
Mehl

(10) Patent No.: US 9,223,196 B2
(45) Date of Patent: Dec. 29, 2015

(54) LIGHTING DEVICE COMPRISING PUMP LIGHT SOURCE AND AT LEAST TWO PHOSPHOR WHEELS

(71) Applicant: Oliver Mehl, Berlin (DE)

(72) Inventor: Oliver Mehl, Berlin (DE)

(73) Assignee: OSRAM GmbH, Munich (DE)

( * ) Notice: Subject to any disclaimer, the term of this patent is extended or adjusted under 35 U.S.C. 154(b) by 126 days.

(21) Appl. No.: 14/194,068

(22) Filed: Feb. 28, 2014

(65) Prior Publication Data

US 2014/0254130 A1  Sep. 11, 2014

(30) Foreign Application Priority Data

Mar. 1, 2013  (DE) .......................... 10 2013 203 572

(51) Int. Cl.
*F21V 9/10* (2006.01)
*G03B 33/08* (2006.01)
*G03B 21/20* (2006.01)

(52) U.S. Cl.
CPC .............. *G03B 33/08* (2013.01); *G03B 21/204* (2013.01)

(58) Field of Classification Search
CPC .... G03B 21/204; G03B 21/206; G03B 33/08; F21V 9/10; F21V 14/08
USPC .......................................................... 362/84
See application file for complete search history.

(56) References Cited

U.S. PATENT DOCUMENTS

| 2002/0109821 | A1* | 8/2002 | Huibers et al. ................... 353/84 |
| 2005/0212980 | A1* | 9/2005 | Miyazaki ....................... 348/744 |
| 2007/0195207 | A1* | 8/2007 | Wang ............................ 348/744 |
| 2013/0100423 | A1* | 4/2013 | Yamagishi et al. .............. 353/98 |
| 2013/0201455 | A1* | 8/2013 | Endo ................................ 353/7 |
| 2013/0229634 | A1* | 9/2013 | Hu et al. ......................... 353/84 |
| 2013/0271954 | A1* | 10/2013 | Li et al. ........................... 362/84 |
| 2014/0369025 | A1* | 12/2014 | Mehl ............................... 362/84 |

FOREIGN PATENT DOCUMENTS

| JP | 2002-006395 | 1/2002 |
| JP | 2006-119440 | 5/2006 |
| JP | 2011-510469 | 3/2011 |

\* cited by examiner

*Primary Examiner* — Christina Riddle
*Assistant Examiner* — Christopher Lamb
(74) *Attorney, Agent, or Firm* — Cozen O'Connor

(57) ABSTRACT

A lighting device comprising a pump light source and two or more phosphor wheels arranged one directly behind another. As a result, firstly, the heat loss can be dissipated via the two phosphor wheels. Secondly, only a single common collecting optical unit is required for collecting the conversion light emitted by the first phosphor wheel and the second phosphor wheel.

15 Claims, 5 Drawing Sheets

LIGHTING DEVICE COMPRISING PUMP LIGHT SOURCE AND AT LEAST TWO PHOSPHOR WHEELS

RELATED APPLICATIONS

This application claims the priority of German Patent Application No. 10 2013 203 572.1 filed Mar. 1, 2013, the entire content of which is incorporated herein by reference.

FIELD OF THE INVENTION

The invention is based on a lighting device comprising a pump light source and a phosphor wheel for converting at least part of the pump light into conversion light. Such a lighting device can be used, in particular, as light-generating unit in a projector, e.g. for video projectors or data projectors.

BACKGROUND OF THE INVENTION

The prior art, for example the document US 2010/0245777 A1, discloses lighting devices for projection applications which comprise a phosphor wheel having one or more phosphors. In this case, said lighting devices comprise a pump light source, which excites the phosphor to emit light having a different wavelength than the pump light wavelength (wavelength conversion of the pump light by means of phosphor). The phosphors are usually arranged successively in the direction of rotation of the phosphor wheel, such that the light (conversion light) emitted by the respective phosphor is generated temporally sequentially and fed to the imaging system.

Lasers, for example laser diodes, are preferably used as the pump light source. In this case, the technology is also known by the designation LARP ("Laser Activated Remote Phosphor"). In order to distribute the laser power over a larger area on average over time and thus to reduce thermal quenching of the phosphor, inter alia, the at least one phosphor is usually applied to a wheel that rotates during operation. A power loss that increases with the pump power and is based for the most part on the difference in energy of the photons between the absorbed radiation and the emitted radiation (Stokes shift) is deposited in said phosphor wheel. Since the pump light is usually in the short-wave spectral range, for example in the blue range, the power loss in the case of phosphors which emit in the red spectral range (red phosphors) is higher than that in the case of phosphors which emit in the green spectral range (green phosphors). This power loss leads to heating of the phosphor wheel. The heat is dissipated by surface radiation, by convection of the ambient medium (e.g. air) and by thermal conduction, e.g. via the rotation spindle, such that a stable operating temperature is established. The conversion efficiency of many phosphors, e.g. nitridic phosphors for the red spectral range (nitridic red phosphors), decreases as the operating temperature rises. The increase in the pump power or power density that is required for higher output powers (light power) results in a higher heat loss or concentration of heat. This can be partly compensated for by the diameter of the phosphor wheel being increased, since a larger area is then available for the dissipation of heat (original diameter of 33 mm, then 40 mm, now 55 mm, in future up to 85 mm). Limits are imposed on this power scaling concept owing to the demands in respect of space requirement and also in respect of the power of the wheel motor.

SUMMARY OF THE INVENTION

One object of the present invention is to provide a lighting device, in particular a lighting device for projection applications, which is also suitable for higher pump powers.

This and other objects are attained in accordance with one aspect of the present invention directed to a lighting device, comprising a pump light source, and a first phosphor wheel. The first phosphor wheel has at least one first phosphor region which can be irradiated with the pump light of the pump light source and re-emits said pump light at least partly in a wavelength-converted fashion, wherein the first phosphor wheel has at least one first transmitted-light region the lighting device includes a second phosphor wheel, wherein the second phosphor wheel has at least one second phosphor region which can be irradiated with the pump light of the pump light source and re-emits said pump light at least partly in a wavelength-converted fashion. The two phosphor wheels are designed for rotation about their rotation spindle, wherein the two phosphor wheels are arranged directly one behind the other and with respect to one another and with respect to a beam path of the pump light source such that the first phosphor region of the first phosphor wheel is rotatable through the beam path of the pump light source, the first transmitted-light region of the first phosphor wheel is rotatable through the beam path of the pump light source, and the second phosphor region of the second phosphor wheel behind the first transmitted-light region of the first phosphor wheel, that is to say situated downstream thereof, is rotatable through the beam path of the pump light source.

In an embodiment of the present invention the phosphor which is to be irradiated with the pump light is divided between two or more phosphor wheels arranged one directly behind another. As a result, firstly, the heat loss can be dissipated via a plurality of phosphor wheels.

This enables the power scaling of the LARP concept far into the multi-kilolumens range. This concept currently appears to be particularly suitable for more than 10 kilolumens (10 klm). Through a region that is transparent to the pump light (transmitted-light region), for example a slot or a transparent material region, in the previous phosphor wheel, the pump light can pass to the succeeding phosphor wheel without a wavelength change. The phosphor wheels therefore rotate through the same pump beam path. Secondly, this arrangement has the advantage that no additional beam-shaping optical components are required for the operation of a plurality of phosphor wheels. In particular, no further separate collecting or focusing optical units are provided in the interspace between the phosphor wheels.

Moreover, phosphors can be divided between different phosphor wheels, in particular taking account of a different temperature dependence of said phosphors. For this purpose, a first phosphor region having at least one phosphor from a group of the type I can be provided on a first phosphor wheel. Moreover, a second phosphor region having at least one phosphor from a group of the type II can be provided on a second phosphor wheel. The phosphors from the group of the type I have a lower temperature dependence of the conversion efficiency than the phosphors from the group of the type II. As a result, the more temperature-sensitive phosphor (type II) is not heated by the heat loss of the other phosphors (type I). The group of the type I can be assigned quite a few yellow, green and blue phosphors, for example cerium-doped garnet phosphors both in the yellow and in the green spectral range. The group of the type II can be assigned most red phosphors, in particular nitridic red phosphors, but also green and blue phosphors, for example on the basis of orthosilicate and barium-aluminum-magnesium.

According to an embodiment of the invention, the conversion light emitted by the phosphors both of the first phosphor wheel and of the second phosphor wheel is collected by a collecting optical unit arranged between the pump light source and the first phosphor wheel. In order that the efficiency of the collecting optical unit for collecting the conversion light does not decrease unacceptably, the first and second phosphor wheels are arranged very closely one behind the other in the vicinity of the focal length of the collecting optical unit. The distance between the first and second phosphor wheels is typically a few millimeters, in particular less than 10 mm, preferably less than 5 mm, particularly preferably less than 2 mm.

Preferably, the collecting optical unit is designed as a chromatic objective, the focal length of which is longer for light of longer wavelengths. In order to optimize the efficiency for collecting the conversion light, a phosphor having the longer-wave conversion spectrum, that is to say in particular a red phosphor, is therefore preferably arranged on the second phosphor region of the "rear" second phosphor wheel, and a phosphor having the shorter-wave conversion spectrum, that is to say for example yellow (Y), green (G) or blue (B) phosphors, is arranged on the first phosphor region of the "front" first phosphor wheel.

The lighting device according to an embodiment of the invention is therefore operated in essence with the following method steps:

Generating first conversion light by rotating the first phosphor wheel through the pump light beam, generating second conversion light by rotating the second phosphor wheel through the pump light beam, collecting the first and second conversion light by means of the collecting optical unit arranged between pump light source and first phosphor wheel.

Since the pump light beam passes through the transmitted-light region of the first phosphor wheel when the second conversion light is generated, the first conversion light and the second conversion light are generated in a temporally offset manner.

The conversion light collected by means of the collecting optical unit can be coupled out from the pump light beam path with the aid of a suitable wavelength-selective optical element, for example a dichroic mirror arranged between the pump light source and the collecting optical unit, and can be fed to an imaging unit, for example.

The position of the focal spot of the pump light between the first phosphor wheel and the second phosphor wheel can also be set by a suitable choice of the focal length of the collecting optical unit. As a result, it is also possible to set in a targeted manner a desired size of the pump light spot and/or the intensity distribution on the respective phosphor wheel, e.g. identical or different sizes of the pump light spots on the two phosphor wheels.

The first phosphor region and the first transmitted-light region are preferably arranged on the first phosphor wheel successively in the direction of rotation, for example in the form of annulus segments, in order to obtain a temporally sequential sequence of different phosphor conversion phases. The first phosphor region on the first phosphor wheel can also comprise a plurality of segments having different phosphors of the type I. Moreover, a second transmitted-light region can also be provided on the first phosphor wheel. The second transmitted-light region can be directly adjacent to the first transmitted-light region or be separated from the first transmitted-light region by a light-opaque segment, in particular a phosphor segment. In the latter case, therefore, the first phosphor region is not continuous, but rather separated into separate subregions.

Moreover, provision can be made for one or a plurality or all of the phosphor wheels to be displaceable in the direction of the respective rotation axis thereof or in the direction of the beam axis of the impinging pump light beam, if the axes are not collinear. As a result, it is possible to vary for example the abovementioned diameter of the respective pump light spot on the phosphor wheel and/or the efficiency of the collecting optical unit for collecting the respective conversion light. In order that the pump light can impinge on the phosphor region of the second phosphor wheel through the transmitted-light region of the first phosphor wheel, the phosphor wheels can be arranged such that they partly overlap one another. In this case, the rotation spindles of the two phosphor wheels are oriented parallel in a manner offset with respect to one another. As viewed in the direction of the rotation spindles, the phosphor or transmitted-light regions of both wheels, the latter in the wraparound case, overlap in the region of the impinging pump light beam. Alternatively, the two phosphor wheels can be arranged on a common rotation spindle. If the two wheels are rigidly connected to the common rotation spindle, the phosphor region has to be arranged on the second phosphor wheel such that at least part thereof lies in rectilinear projection of the transmitted-light region of the first phosphor wheel. Only then does the pump light beam also impinge on the phosphor region of the second phosphor wheel when the transmitted-light region of the first phosphor wheel rotates through the pump light beam. In order that the efficiency for collecting the conversion light is not reduced unacceptably, the two phosphor wheels are preferably arranged relatively closely one behind the other and at least in the vicinity of the wavelength-dependent foci. On account of the wavelength-dependent focal length differences of the chromatic objective that can be realized, the two phosphor wheels are typically arranged at a distance of a few mm. In order to improve the dissipation of the heat loss, in particular of the rear phosphor wheel (as viewed from the impinging pump light beam), internal ventilation between the two phosphor wheels may be advantageous.

In the case of separate rotation spindles, an additional third phosphor wheel can also be provided. The rotation spindles of the three phosphor wheels are oriented parallel in a manner offset with respect to one another such that the three phosphor wheels overlap directly one behind another in a common subregion and rotate through the pump light beam in this overlap region.

Moreover, the first phosphor wheel can also have a filter region having a spectral filter effect for the conversion light emitted by the second phosphor wheel. Said filter region must, of course, be transparent to the pump light simultaneously passing through. In other words, a transmission region is embodied as a spectral filter which, on the one hand, spectrally filters the conversion light and, on the other hand, allows the pump light to pass through unchanged.

By way of example, the second phosphor wheel can be provided with a yellow phosphor and the first phosphor wheel with a different phosphor, e.g. green phosphor, and a transmission region designed as a combination filter. The combination filter combines a long-pass filter with an additional transmission band at the pump light wavelength (for example 450+/−10 nm). As a result, on the one hand, the pump light can pass through the filter region spectrally unchanged, and, on the other hand, only the long-wave, that is to say red, spectral component of the conversion light emitted by the yellow phosphor is allowed to pass through by the long-pass filter. Such a configuration has the advantage that a temperature-sensitive red phosphor can be dispensed with. It has been found that, under real conditions, it is thus possible to generate a higher luminous flux than with a red phosphor, owing to the latter having a significantly higher temperature dependence of the conversion efficiency.

BRIEF DESCRIPTION OF THE DRAWINGS

The invention will be explained in greater detail below with reference to exemplary embodiments. In the figures.

DETAILED DESCRIPTION OF THE DRAWINGS

Features that are identical or of identical type may also be designated by identical reference signs hereinafter, for the sake of simplicity.

Figure 1:
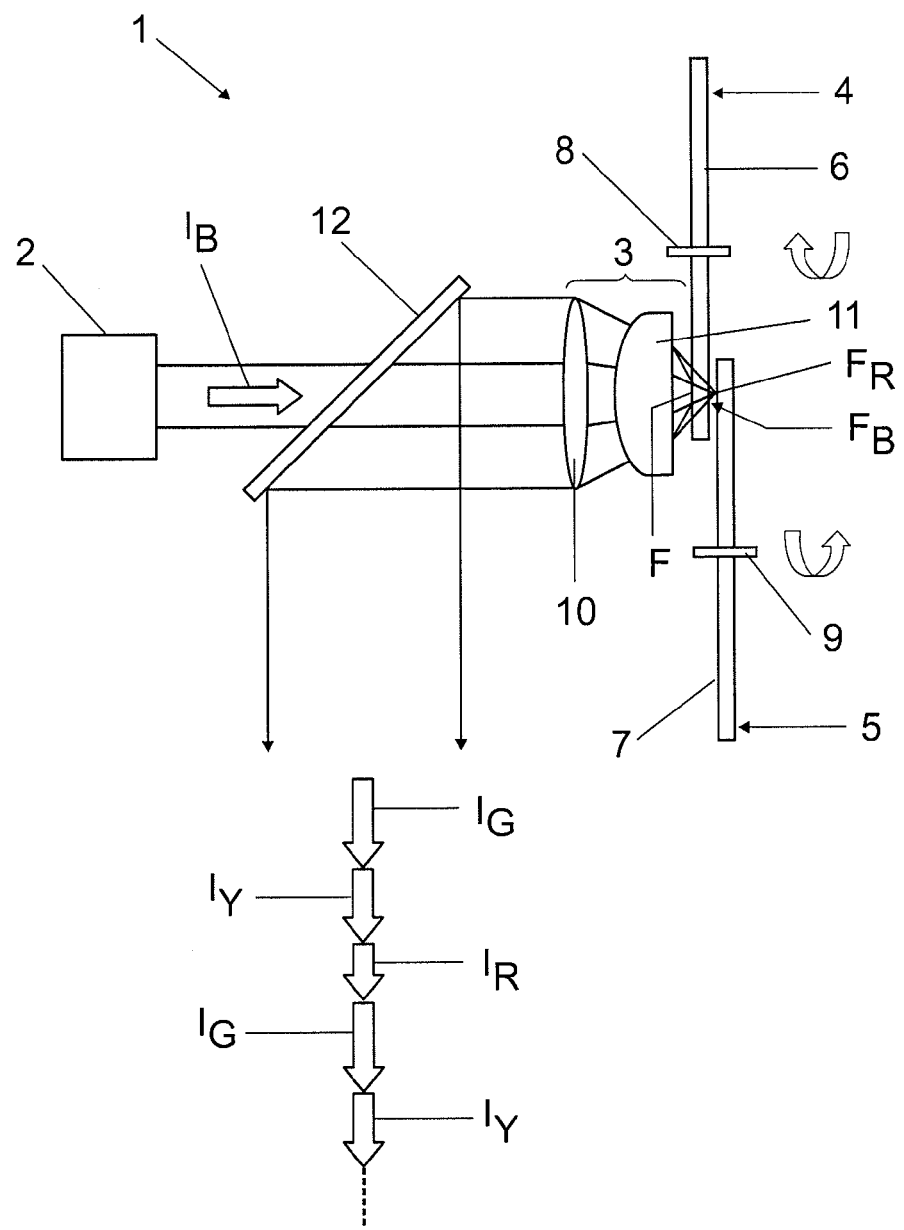
FIG. 1 shows an exemplary embodiment of a lighting device according to the invention comprising two phosphor wheels.

FIG. 1 shows a schematic illustration of a lighting device 1 in accordance with one exemplary embodiment of the invention.

The lighting device 1 comprises a laser device 2 as pump light source. The laser device 2 is designed to emit laser light in the blue spectral range, since, firstly, this constitutes a suitable excitation wavelength for most phosphors. Secondly, this makes it possible to utilize the unconverted blue laser light as a blue light channel (B), for example for an RGB projection unit. For further details in this regard, reference is made to the further exemplary embodiment illustrated in FIG. 3. The emission wavelength of the blue laser radiation $I_B$ is preferably in the range of e.g. approximately 400-470 nm.

The blue laser light $I_B$ (=pump light) is imaged, by means of an optical lens system 3, onto a first phosphor wheel 4 and a second phosphor wheel 5, which is arranged directly behind the latter. The two phosphor wheels 4, 5 each have a circular carrier plate 6, 7 and a centrally arranged rotation spindle 8, 9. A respective motor for rotating the two phosphor wheels and a control unit for synchronizing the rotations of the two phosphor wheels are not illustrated, for the sake of better clarity.

Figure 2:
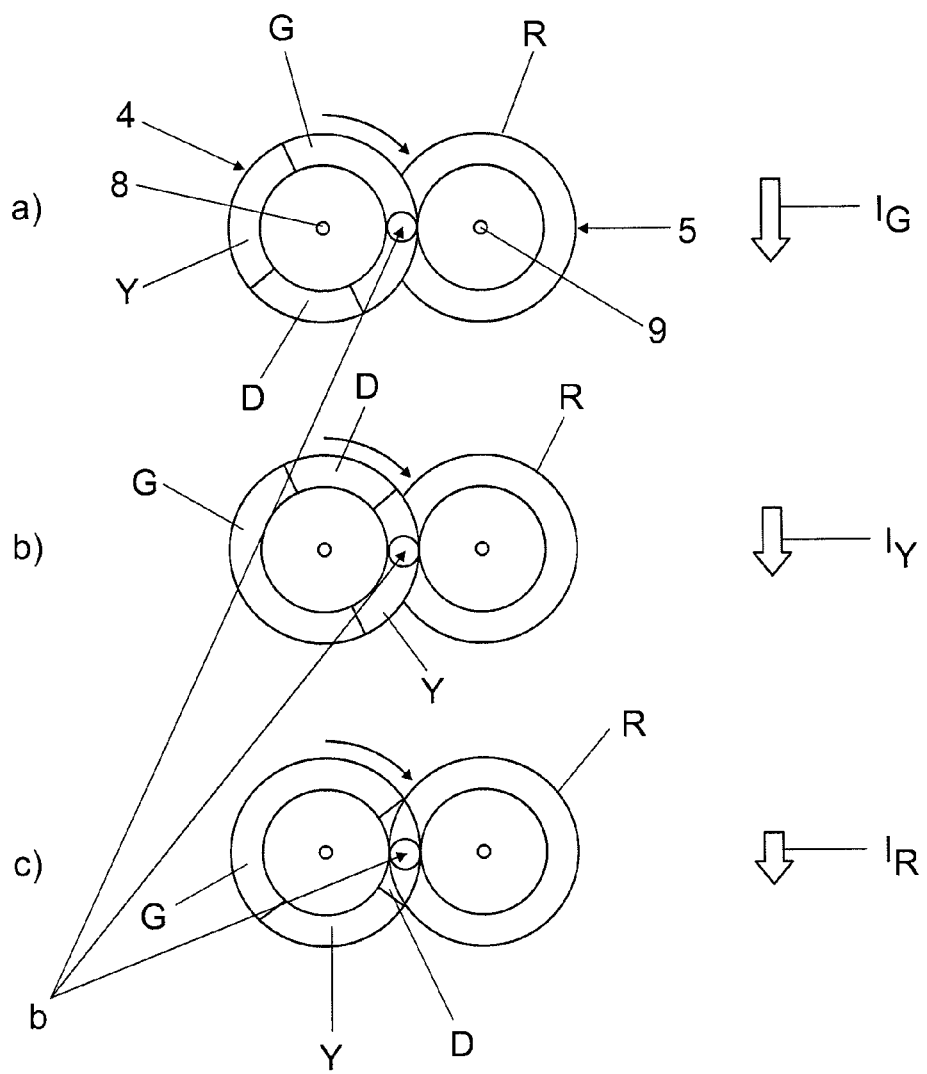
FIGS. 2a-c show a first embodiment of the two phosphor wheels in accordance with the lighting device from FIG. 1.

Reference will now also be made hereinafter to FIGS. 2a-2c, which show the two phosphor wheels 4, 5 in schematic illustration, specifically in three different rotational positions. That side of the respective carrier plate 6, 7 of each phosphor wheel 4, 5 which faces the laser device 2 has an annular region. In the case of the first phosphor wheel 4, said annular region is subdivided into three segments. The first segment G is coated with a green phosphor, the second segment Y is coated with a yellow phosphor, and the third segment D is designed as a transmitted-light segment, that is to say allows the pump light $I_B$ to pass through. For this purpose, the transmitted-light segment D is embodied e.g. as a through-opening. The through-opening can also be filled with a material that is transparent to the pump light $I_B$. The first phosphor wheel 4 is arranged such that its segmented annular region can rotate through the pump light beam $I_B$ (discernible from the schematic pump laser beam spot b). The segments G, Y, D are therefore irradiated by the pump light $I_B$ temporally sequentially. In this case, the two phosphor segments G, Y are excited to emit wavelength-converted light, specifically green and yellow light, respectively. The green light phase of the phosphor wheels 4, 5 is illustrated in FIG. 2a, and the yellow light phase in FIG. 2b. The duration and sequence of the colored light phases or colored luminous fluxes are defined by the order and length of the phosphor segments and symbolized by the associated arrows $I_G$ and $I_Y$.

The annular region R of the second phosphor wheel 5 is coated with a red phosphor continuously, that is to say in an unsegmented manner. Moreover, the second phosphor wheel 5 is arranged such that part of its annular red phosphor region R overlaps part of the segmented annular region of the first phosphor wheel 4 in the region of the pump light spot b. While the first phosphor wheel 4 rotates in the transmitted-light phase, i.e. the pump light $I_B$ passes through the transmitted-light segment D, the pump light $I_B$ impinges on the red phosphor region R of the second phosphor wheel 5, said red phosphor region rotating past behind the transmitted-light segment D. In this case, the red phosphor is excited by the pump light $I_B$ to emit red light. This red light phase of the phosphor wheels 4, 5 is illustrated in FIG. 2c and symbolized by the arrow $I_R$. In FIG. 1, the sequence and duration of the colored luminous fluxes are likewise symbolized by corresponding arrows, namely alternately light of the colors green ($I_G$), yellow ($I_Y$), red ($I_R$), green ($I_G$), yellow ($I_Y$), red ($I_R$), etc.

Preferably, the lens system 3 is designed such that it generates the focus $F_B$ of the pump light $I_B$ (=the laser beam waist) in the narrow gap between the two phosphor wheels 4, 5. Moreover, the lens system 3 collects the colored light emitted by the respective phosphor within the pump light spot b, that is to say also acts as a collecting optical unit for the conversion light. For this purpose, the lens system 3 has a converging lens 10 and a chromatic objective 11. The chromatic objective 11 is preferably designed for efficiency reasons such that its longer focal length $F_R$ for red light approximately coincides with its distance from the red phosphor region R of the second phosphor wheel 5. As a result, the chromatic objective 11 particularly efficiently collects the red light emitted by the red phosphor region R of the second phosphor wheel 5. For a corresponding reason, its average focal length F for the yellow and green light emitted by the first phosphor wheel 4 is preferably designed such that it coincides approximately with its distance from the segmented phosphor region of the first phosphor wheel 4.

The wavelength-converted colored light (=conversion light) reflected back from the respective phosphor rotating past under the pump light spot b is collimated by the lens system 3 (chromatic objective 11 and converging lens 10) and coupled out from the pump light beam path by means of reflection via a dichroic mirror 12. For this purpose, the dichroic mirror 12 is arranged between the pump light source 2 and the lens system 3 in a 45° tilting position with respect to the pump light beam path or oppositely directed conversion light beam path. Moreover, the dichroic mirror 12 is designed actually to transmit light in the blue spectral range (that is to say including the blue pump light), but to reflect light in the non-blue spectral range (that is to say including the conversion light). As a result, on the one hand, the blue pump light $I_B$ can pass through the dichroic mirror 12 onto the two phosphor wheels 4, 5; on the other hand, the dichroic mirror 12 couples the temporally sequentially impinging wavelength-converted, that is to say green $I_G$, yellow $I_Y$ and respectively red light $I_R$ (=conversion light) out perpendicularly from the pump light beam path. The dichroic mirror 12 therefore serves here as a wavelength-selective beam deflector that transmits the pump light and reflects the conversion light. Depending on the requirement made of the geometry of the optical construction, the position of the pump light source 2 can also be interchanged with the output for the coupled-out light. For this purpose, it is merely necessary to modify the dichroic mirror in such a way that it reflects the blue pump light $I_B$ and transmits the conversion light.

Figure 3:
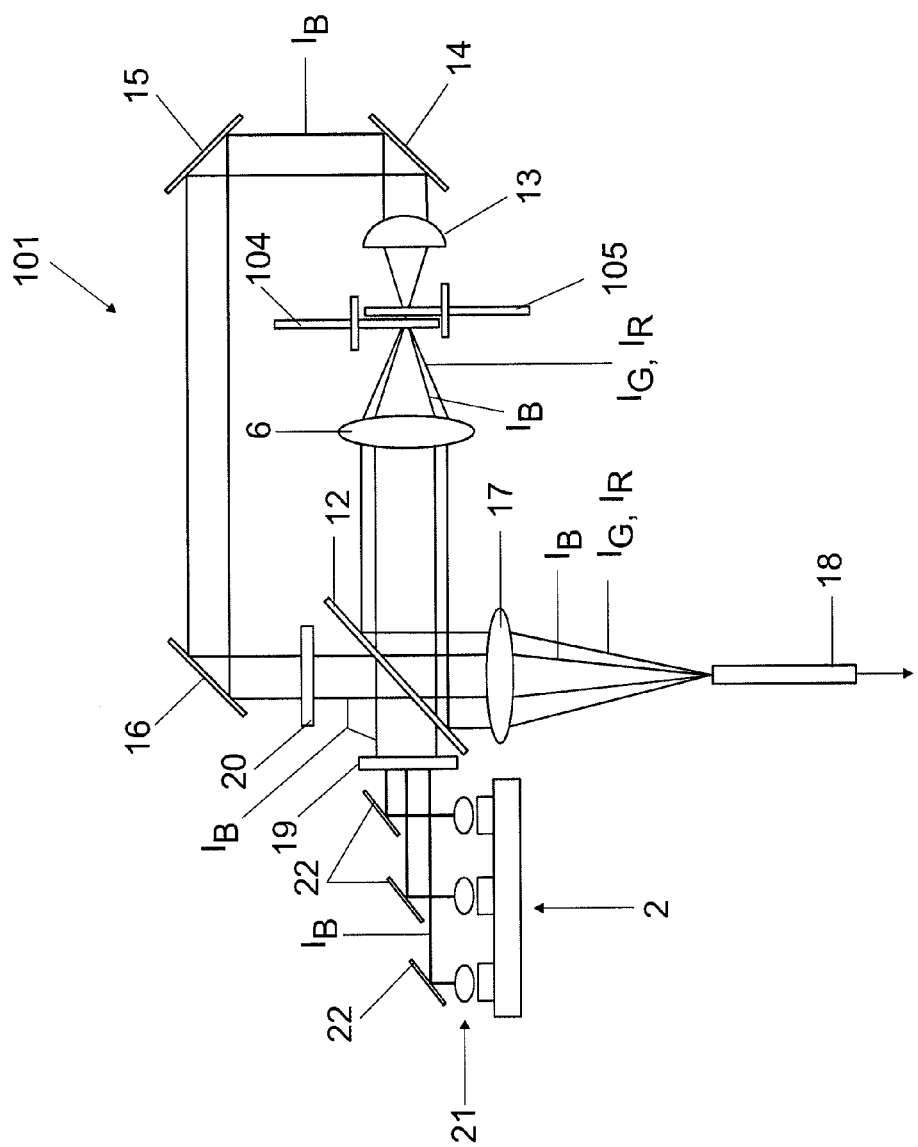
FIG. 3 shows a further exemplary embodiment of a lighting device according to the invention comprising two phosphor wheels.

FIG. 3 shows a schematic illustration of a lighting device 101 in accordance with a second exemplary embodiment of the invention. The lighting device 101 comprises a pump light source 2 designed as a laser diode matrix and having a plurality of laser diodes 21 (here in each case including primary lens). Via deflection mirrors 22 assigned to the laser diodes 21, the blue laser light $I_B$ of said laser diodes 21 is directed into the optical lens system 6 (corresponding to the lens system illustrated in FIG. 1) and is imaged by the latter onto a first phosphor wheel 104 and a second phosphor wheel 105, which is arranged directly behind the latter.

Figure 4:
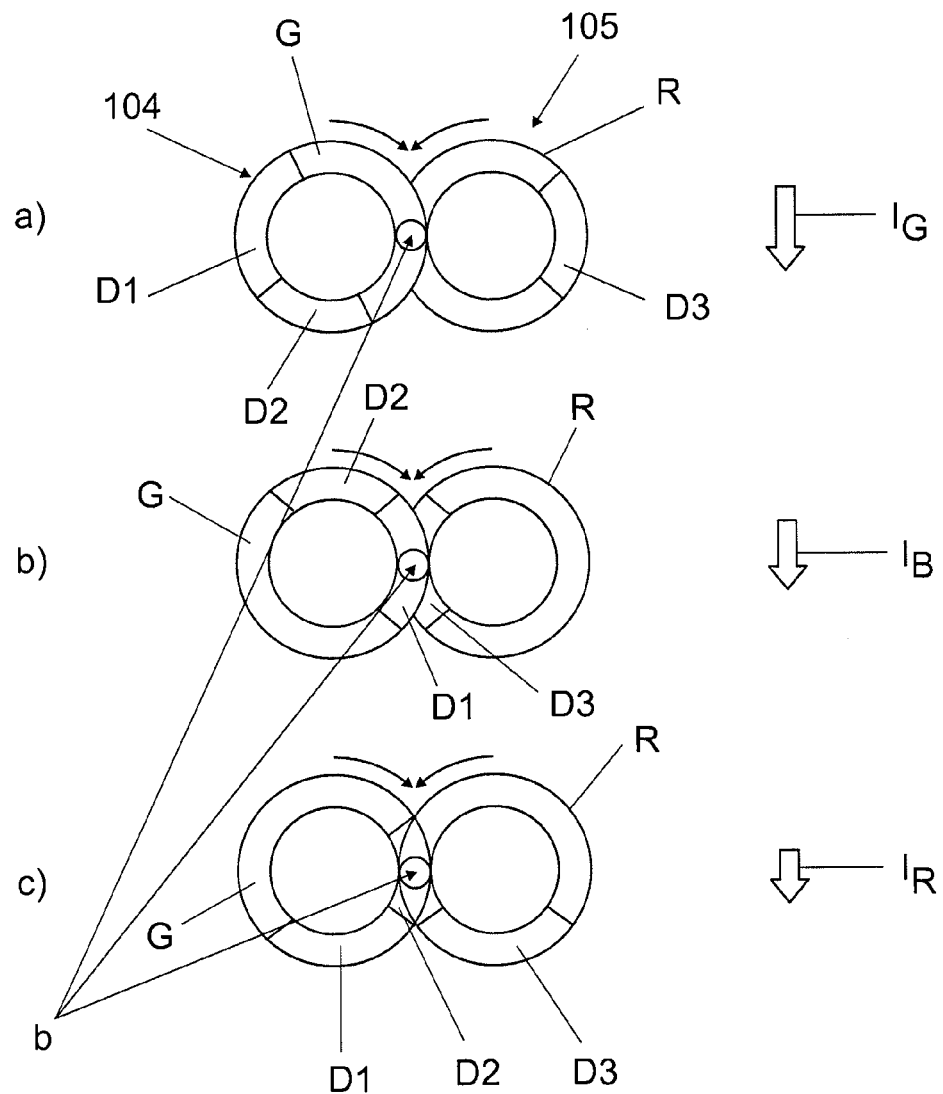
FIGS. 4a-c show an embodiment of the two phosphor wheels in accordance with the lighting device from FIG. 3.

Reference will now also be made below to FIGS. 4a-4c, which show the two phosphor wheels 104, 105 in schematic illustration, specifically in three different rotational positions.

The annular region of the first phosphor wheel 104 has one green phosphor segment G and two transmitted-light segments D1, D2. The annular region of the second phosphor wheel 105 has one red phosphor segment G and one transmitted-light segment D3. The two phosphor wheels 104, 105 are synchronized with one another such that the first transmitted-light segment D1 of the first phosphor wheel 104 rotates simultaneously with the third transmitted-light segment D3 on the second phosphor wheel 105 through the laser beam spot b. While the green phosphor segment G of the first phosphor wheel 104 rotates through the pump laser beam $I_B$ (discernible from the schematic laser beam spot b), the blue laser light $I_B$ is converted into green light $I_G$ by the green phosphor. This green light phase of the two phosphor wheels 104, 105 is illustrated in FIG. 4a and symbolized by the arrow $I_G$.

While the succeeding first transmitted-light segment D1 of the first phosphor wheel 104 rotates through the pump laser beam $I_B$, the transmitted-light segment D3 of the synchronized second phosphor wheel 105 also rotates through the pump laser beam $I_B$. Consequently, the blue pump light beam $I_B$ passes through both phosphor wheels 104, 105 unchanged. This blue light phase of the two phosphor wheels 104, 105 is illustrated in FIG. 4b and symbolized by the arrow $I_B$. The blue pump light $I_B$ radiating through the transmitted-light segments D1, D3 of the two phosphor wheels 104, 105 is collimated by means of a further optical unit 13, is deflected via three deflection mirrors 14, 15, 16 into a so-called "wraparound" branch and guided back to the dichroic mirror 12. The unconverted blue pump light beam $I_B$ coming from the "wraparound" branch during the blue light phase passes through the dichroic mirror 12. By contrast, the converted (=wavelength-converted) green and red light beams $I_G$, $I_R$ impinging temporally sequentially on the other side of the dichroic mirror 7 during the green and red light phases, respectively, are reflected by the dichroic mirror 12. Since the pump light beam $I_B$ and temporally sequentially the respective conversion light beam $I_G$, $I_R$ (sequence: green (G), blue (B), red, etc.) impinge on the two opposite sides of the dichroic mirror 12 perpendicularly to one another and respectively at 45°, ultimately the two beam paths are brought together collinearly in this way and focused via a further focusing lens system 17 for spatial superimposition (intermixing) for example into an integrator 18 of an RGB projection module.

A filter wheel (not illustrated) may also be arranged between the focusing lens system 17 and the integrator 18 in order to spectrally narrow or vary the generally very wide spectrum of the light (conversion light) wavelength-converted by a phosphor and thus e.g. to optimize the color space for the respective projection application.

A homogenizer 19 is also disposed downstream of the laser diode matrix 2 in order to obtain an as uniform as possible power density distribution of the blue laser radiation Ig on the respective phosphor of the two phosphor wheels 104, 105. So-called quenching is thereby intended to be avoided or minimized as much as possible. Quenching is a reduction of the conversion efficiency of the phosphor on account of increased power density (intensity quenching) and/or increased temperature (thermal quenching). A plateau-shaped power density distribution of the pump light on the phosphor would be ideal.

Furthermore, a second homogenizer 20 is provided between the third deflection mirror 16 and the dichroic mirror 12 in order that the blue pump light $I_B$ of the wraparound branch is further homogenized before combination with the conversion light $I_G$, $I_R$ or in order to reduce speckle patterns that possibly occur in the application. The homogenizers can also contain optical elements for beam shaping.

Figure 5:
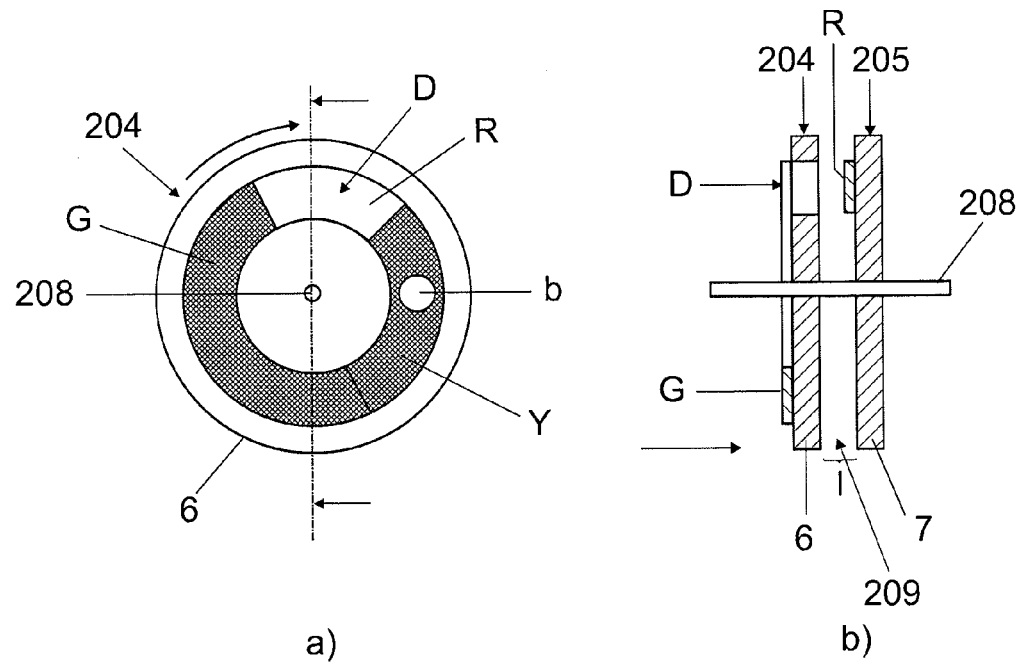
FIG. 5 shows an embodiment of two phosphor wheels having a common rotation spindle.

FIGS. 5a, b schematically illustrate an embodiment of two phosphor wheels 204, 205 having a common rigid rotation spindle 208, specifically in plan view (FIG. 5a) and sectional view (FIG. 5b). The first phosphor wheel 204 has an annular region on the free front side of its circular carrier plate 6, said annular region being subdivided into one transmitted-light segment D and two phosphor segments Y and G. The transmitted-light segment D is embodied as a through-opening. The phosphor segments Y and G are coated with a yellow and green phosphor, respectively. The second phosphor wheel 205 is arranged behind the first phosphor wheel 204 such that a gap 209 having a width l of typically approximately 1 mm arises between the two phosphor wheels. In order to improve the dissipation of heat from the gap 209, internal cooling can be provided (not illustrated).

In the projection of the transmitted-light segment D, a red phosphor R is applied on that side of the circular carrier plate 7 of the second phosphor wheel 205 which faces the first phosphor wheel 204. Since both phosphor wheels 204, 205 are arranged rigidly on the common rotational spindle 208, the pump light beam $I_B$ impinges on the red phosphor R each time when the transmitted-light segment D rotates through the pump light spot b. In the case of the direction of rotation (in the clockwise direction) shown in FIG. 5a, the temporally sequential colored light sequence is therefore yellow (Y), red, green (G), etc. In this respect, this embodiment of two phosphor wheels 204, 205 having a common rigid spindle can e.g. readily replace the two overlapping phosphor wheels 4, 5 having separate rotation spindles as shown in FIG. 1.

Figure 6:
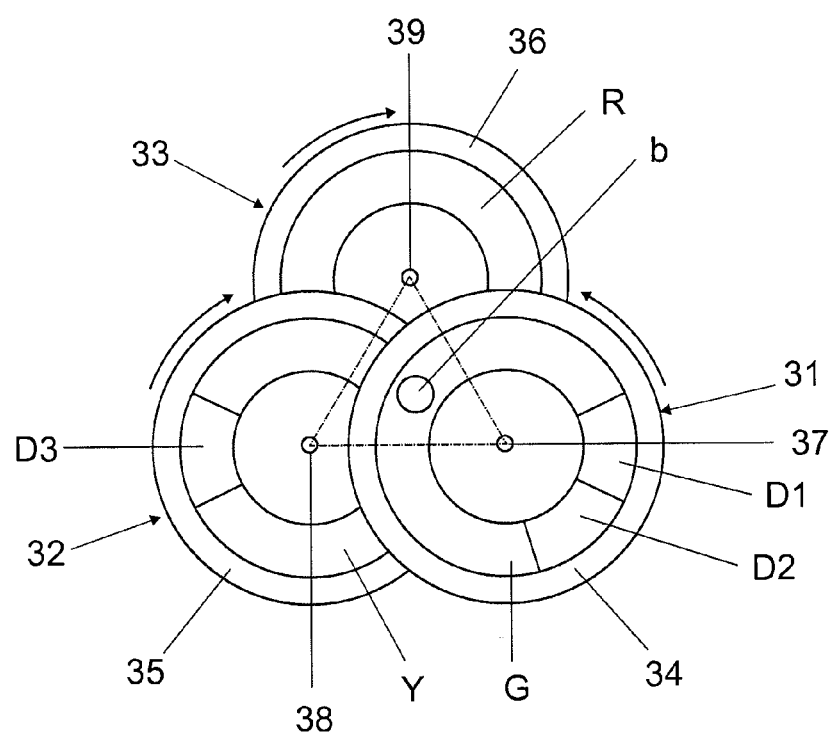
FIG. 6 shows an embodiment of three overlapping phosphor wheels.

FIG. 6 shows an embodiment of three overlapping phosphor wheels 31, 32, 33 in schematic illustration. The respective circular carrier plates 34, 35, 36 of the phosphor wheels 31, 32, 33 each have an annular region on their side facing the incident pump light spot b. The phosphor wheels 31, 32, 33 are arranged such that the annular regions overlap one behind another in the projection of the pump light spot b impinging on the annular region of the first phosphor wheel 31. For this purpose, the respective rotation spindles 37, 38, 39 are arranged at the vertexes of an imaginary equilateral triangle, the centroid of which lies at the midpoint of the pump light spot b. The annular region of the first phosphor wheel 31 is subdivided into a first transmitted-light segment D1, an adjacent second transmitted-light segment D2 and a green phosphor segment G. While the green phosphor segment G rotates through the pump light spot b, the green phosphor emits green light (green light phase). While one of the two transmitted-light segments D1, D2 rotates through the pump light spot b, the pump light impinges, without being obstructed, on the second phosphor wheel 32 arranged therebehind. The annular region of the second phosphor wheel 31 is subdivided into a transmitted-light segment D3 and a yellow phosphor segment Y. Moreover, the transmitted-light segment D3 is synchronized with the first transmitted-light segment D1 of the first phosphor wheel 31. While the second transmitted-light segment D2 of the first phosphor wheel 31 rotates through the pump light spot b, the pump light impinges on the yellow phosphor segment Y and the yellow phosphor emits yellow light (yellow light phase). While the first transmitted-light segment D1 of the first phosphor wheel 31 rotates through the pump light spot b, the pump light also passes through the synchronous transmitted-light segment D3 of the second phosphor wheel 32 and impinges, without being obstructed, on the third phosphor wheel 33 arranged therebehind. The annular region of the third phosphor wheel 33 is embodied as a circumferential red phosphor ring. The temporal sequence of the conversion light is therefore green, yellow, red, etc. In this respect, this embodiment of three overlapping phosphor wheels 31-33 can for example readily replace the two overlapping phosphor wheels 4, 5 as shown in FIG. 1. With a fourth transmitted-light segment (not illustrated) arranged at a suitable location of the third phosphor wheel 33, it would even be possible to realize a wraparound solution for blue light. This variant would then be suitable for the exemplary embodiment illustrated in FIG. 3.

In so far as technically expedient, features of different exemplary embodiments and embodiments can also be combined with one another.

The excitation light source can comprise laser sources of identical type and/or different laser sources, for example having different laser wavelengths or directions of polarization. The axes of the color wheels need not necessarily be arranged collinearly, but rather can also be tilted. Moreover, the phosphor wheels can also be arranged in a movable fashion, for example in order to move them into and out of the pump light beam. The surfaces of the color wheels need not necessarily be arranged in a coplanar manner with respect to one another, but rather can also be tilted relative to one another, in order thereby to obtain better ventilation, for example. The surface of the color wheels can also be embodied in a curved fashion, in particular in a freeform fashion. The color wheels can have different diameters.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A lighting device, comprising:
   a. a pump light source;
   b. a first phosphor wheel,
      i. wherein the first phosphor wheel has at least one first phosphor region which can be irradiated with the pump light of the pump light source and re-emits said pump light at least partly in a wavelength-converted fashion, and
      ii. wherein the first phosphor wheel has at least one first transmitted-light region;
   c. a second phosphor wheel,
      i. wherein the second phosphor wheel has at least one second phosphor region which can be irradiated with the pump light of the pump light source and re-emits said pump light at least partly in a wavelength-converted fashion,
   d. wherein the two phosphor wheels are configured for rotation about a rotation spindle, and
   e. wherein the two phosphor wheels are arranged directly one behind the other and with respect to one another and with respect to a beam path of the pump light source such that
      i. the first phosphor region of the first phosphor wheel is rotatable through the beam path of the pump light source,
      ii. the first transmitted-light region of the first phosphor wheel is rotatable through the beam path of the pump light source, and
      iii. the second phosphor region of the second phosphor wheel behind the first transmitted-light region of the first phosphor wheel is rotatable through the beam path of the pump light source.

2. The lighting device as claimed in claim 1, wherein the first phosphor region comprises at least one phosphor from a group of a type I and the second phosphor region comprises at least one phosphor from a group of a type II, and wherein the phosphors from the group of the type I have a lower temperature dependence of the conversion efficiency than the phosphors from the group of the type II.

3. The lighting device as claimed in claim 1, wherein the first phosphor wheel has a filter region having a spectral filter effect for the conversion light from the second phosphor wheel.

4. The lighting device as claimed in claim 1, comprising a collecting optical unit arranged between the pump light source and the first phosphor wheel, wherein the collecting optical unit is provided for collecting the conversion light emitted by the first phosphor wheel and the conversion light emitted by the second phosphor wheel.

5. The lighting device as claimed in claim 4, wherein the collecting optical unit is designed such that a focal spot ($F_B$) of the pump light lies between the first phosphor wheel and the second phosphor wheel.

6. The lighting device as claimed in claim 4, wherein the collecting optical unit comprises a chromatic objective, a focal length of which for the light wavelength-converted by the second phosphor region of the second phosphor wheel is longer than a focal length of said chromatic objective for the light wavelength-converted by the first phosphor region of the first phosphor wheel.

7. The lighting device as claimed in claim 1, wherein the first phosphor region and the first transmitted-light region are arranged on the first phosphor wheel successively in the rotation direction.

8. The lighting device as claimed in claim 1, wherein the first phosphor region of the first phosphor wheel is segmented.

9. The lighting device as claimed in claim 1, wherein the two phosphor wheels are arranged such that their rotation spindles are oriented parallel in a manner offset with respect to one another and the phosphor wheels partly overlap one another as viewed in the direction of the rotation spindles.

10. The lighting device as claimed in claim 1 comprising an additional third phosphor wheel, wherein the rotation spindles of the three phosphor wheels are oriented parallel in a manner offset with respect to one another and the three phosphor wheels overlap in a common partial region as viewed in the direction of the rotation spindles.

11. The lighting device as claimed in claim 1, wherein at least one of the phosphor wheels is configured to be able to be moved into and out of the pump light beam.

12. The lighting device as claimed in claim 1, wherein the first phosphor wheel and the second phosphor wheel are arranged on a common rotation spindle.

13. The lighting device as claimed in claim 12, wherein the two phosphor wheels are in each case rigidly connected to the common spindle and the second phosphor region is arranged on the second phosphor wheel such that at least part of the second phosphor region lies in rectilinear projection of the transmitted-light region of the first phosphor wheel.

14. The lighting device as claimed in claim 1, wherein at least one of the phosphor wheels is displaceable in the direction of its rotation axis.

15. A method for operating a lighting device as claimed in claim 1 comprising the following method steps:
 generating first conversion light by rotating the first phosphor wheel through the pump light beam,
 generating second conversion light by rotating the second phosphor wheel through the pump light beam.
 collecting the first and second conversion light by means of the collecting optical unit arranged between pump light source and first phosphor wheel.

* * * * *